Feb. 5, 1935.  E. R. WEAVER  1,989,726
VEHICLE BRAKE
Filed March 13, 1931  2 Sheets-Sheet 1
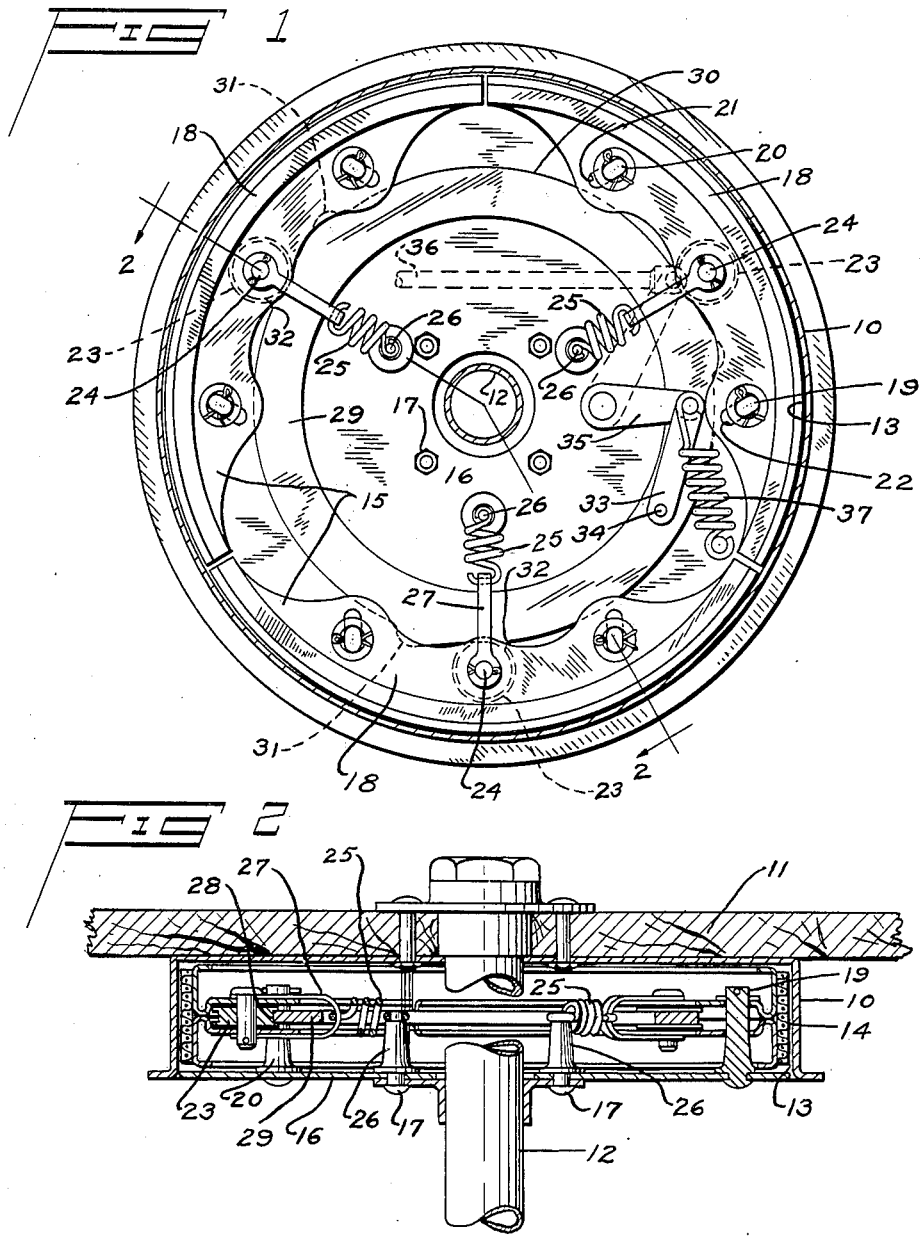
INVENTOR
EDGAR R WEAVER
BY Robert H. Young
ATTORNEY

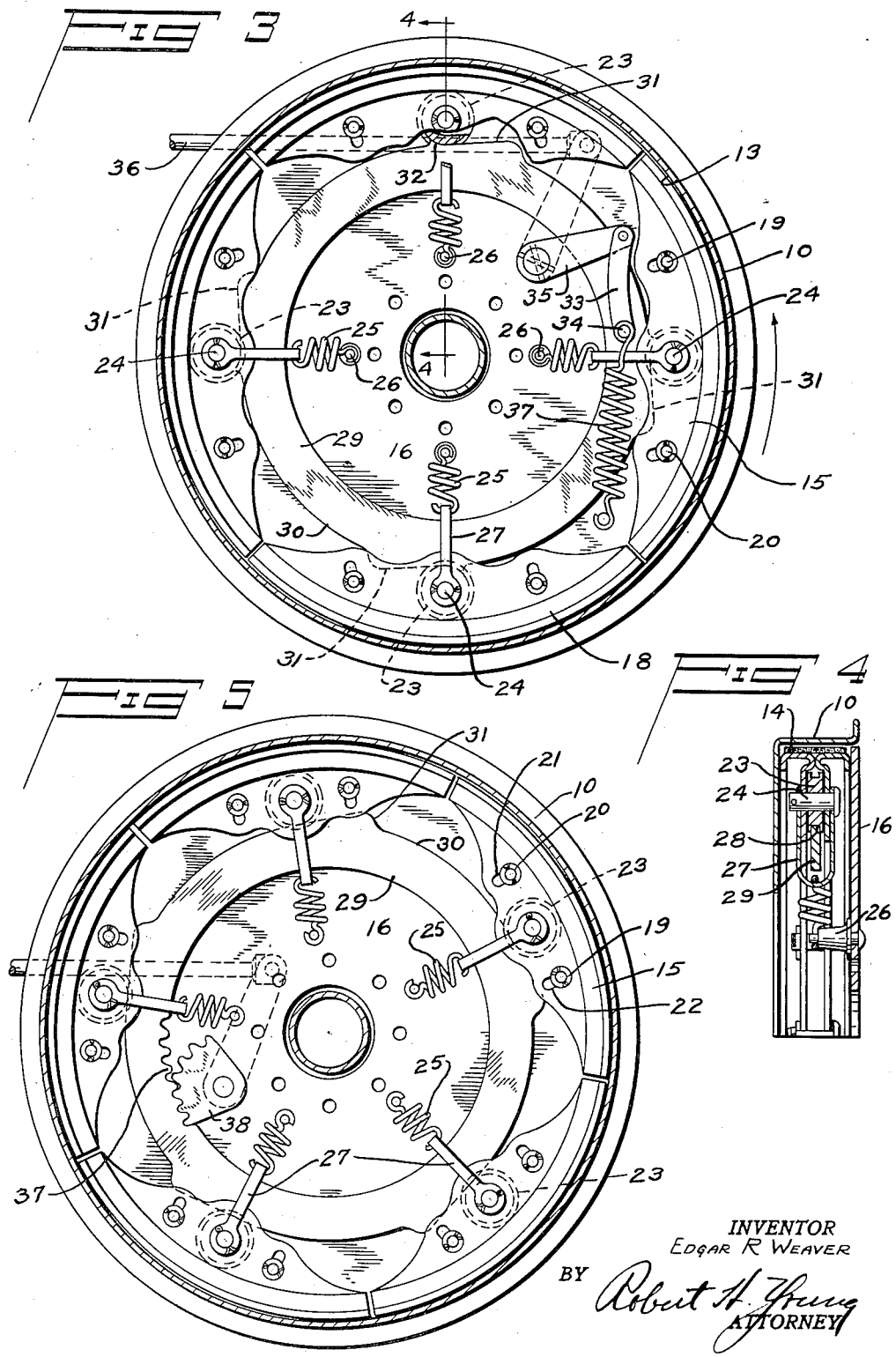

Patented Feb. 5, 1935

1,989,726

UNITED STATES PATENT OFFICE 1,989,726

VEHICLE BRAKE

Edgar R. Weaver, Dayton, Ohio

Application March 13, 1931, Serial No. 522,467

1 Claim. (Cl. 188—78)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to improvements in vehicle brakes, more particularly to brakes which are especially adaptable for use in connection with the landing wheels of an airplane.

The primary object of the present invention is to provide a vehicle brake mechanism including a plurality of radially arranged brake shoes for frictional engagement with a brake drum and pressure applying means so constructed and arranged whereby on the application of pressure thereto the braking pressure will be equally distributed throughout the effective braking area of the brake drum.

Another object of the present invention is to provide in a brake of the character described, pressure applying means floatingly supported and cooperating with the brake shoes and brake drum and which when pressure is applied tends to center itself with respect to the brake shoes and to effect a centering of the brake shoes with respect to the brake drum, thus assuring that the brake pressure is radially equalized.

Another object of the present invention is to provide in a vehicle brake mechanism of this character, a plurality of radially disposed segmental brake shoes carried upon the backing plate of the brake assembly, the point of attachment of the brake shoes being maintained as near the periphery of the backing plate as possible, so that when brake pressure is applied the braking torque is more evenly distributed over the entire area of the backing plate.

Another object of the present invention is to provide in a brake mechanism of this character, means for preventing the relative lateral movement of said brake shoes and the pressure applying means, and thus obtain maximum efficiency from the brake lining.

The invention is further characterized by providing in a manner as hereinafter set forth, a friction brake mechanism which is comparatively simple in its construction and arrangement and extremely light-weight in its character, and in which the similar parts of the entire brake assembly are interchangeable with respect to rights and lefts. Under these conditions the brake mechanism is particularly adapted for use in connection with the running gear of an airplane in that its arrangement permits a strong, durable and compact construction, being thoroughly efficient in its use, conveniently operated, readily installed and comparatively inexpensive to set up. With the aforementioned objects in view, the invention consists in a novel arrangement and construction and combination of the parts of which the preferred embodiment is shown in the accompanying drawings, wherein:

Fig. 1 is a side elevation of the friction brake mechanism showing the shoes in normal position;

Fig. 2 is a sectional view taken on the line 2—2 of Fig. 1;

Fig. 3 is a side elevation of the brake mechanism including a four-shoe construction and illustrating the adaptability of the mechanism to assemblies having any reasonable number of brake shoes;

Fig. 4 is a sectional view taken on the line 4—4 of Fig. 3; and

Fig. 5 is a view in side elevation showing a modified form of brake mechanism.

Referring more particularly to the drawings wherein corresponding parts are designated by like numerals throughout the several views thereof, the wheel brake assembly in the preferred embodiment of my invention herein illustrated includes a metal drum 10 that may be secured to the vehicle wheel 11, or to any other suitable means of support, and an axle 12 that may be constructed in the usual way or in any desired manner. The foregoing parts are old and well-known in the art and for that reason are not shown or described in detail.

The drum 10 is provided with an internal peripheral braking surface 13 that is adapted to be engaged by the brake lining 14 provided on the brake shoes, generally indicated by numeral 15 to retard or stop the wheel.

As will be noted by referring to Fig. 1, the brake assembly includes a backing plate 16, which is held stationary relative to the wheel and, in the present instance and for the purpose of illustration, the backing plate being secured to the axle housing as by bolts 17 or the like in order that the said backing plate may be readily removable if so desired.

Upon the backing plate 16 are disposed a plurality of segmental brake shoes 18, each shoe having secured to its peripheral edge in a well-known manner a strip of brake lining 14, which is adapted for frictional engagement with the braking surface 13 of the brake drum guide lugs 19 and 20, secured to the backing plate 16, as by rivets or the like and operating in elongated openings 22 and 21 respectively formed in the ends of each shoe, maintain the brake shoes in spaced relation, arrest the movement of the shoes toward one another and yet permit the shoes to be readily movable radially with respect to the backing plate when it is desired to apply braking pressure.

The brake shoes may be of sheet metal construction, of light-weight material such as duralumin or other light-weight metal of sufficient rigidity or strength to thoroughly withstand the braking torque. As will be noted, the brake shoes are of symmetrical conformation in order that they may be interchangeable with respect to rights and lefts.

Centrally located upon each brake shoe and extending from the inner end thereof are rollers 23 freely rotatable upon bearing pins 24 secured to the brake shoe springs 25, which anchor at their inner ends to struts 26 carried upon the backing plate 16 or attached at their opposite ends to stirrups 27, which are pivotally mounted upon the outer ends of the pins 24 and operated to disengage the brake shoes from the brake drum the instant the brake operating mechanism is returned to normal position.

As will be noted by referring to Fig. 2, the rollers 23 are provided with grooves 28 within which a floating ring cam actuating element 29 is carried and which is free to rotate relative to said shoes. The outer peripheral surface 30 of the ring cam element is formed with a plurality of cam lobes 31, which may be of any desired contour best adapted to move each brake shoe radially outward in accordance with the degree of braking pressure desired. The release springs 25 heretofore mentioned being normally under tension, also tend to maintain the brake shoes in operative engagement with the cam surface of the ring cam element at all times and yet permit the said element to be freely rotated to move the brake shoes into braking position.

Since the ring cam element is carried by and rotatable relative to the brake shoes, it will be apparent that it floats with respect to the backing plate and brake drum. In this manner eccentricities occurring between the brake drum and brake shoes are automatically compensated for by the tendency of the ring cam element to shift itself relative to the back plate and brake drum, and as a result the brake shoe pressure will be automatically equalized.

The ring cam element 29, as will be noted by referring to Fig. 1, is formed with raised portions 32 acting as stops against which the rollers 23 are adapted to be held upon release of the brake shoes.

Any suitable control mechanism for actuating the cam element may be provided, but in the present illustrative case an arm 33 pivotally mounted on the ring cam element, as indicated by numeral 34, has its free end pivotally connected to the crank member 35, which is in turn pivotally mounted to the backing plate 16, the outer end of which connects to the brake rod 36, as shown in Fig. 1. A spring 37 secured to the backing plate 16 at one end, anchors to the crank member 35, as shown to return the cam element to normal position when the brakes are released.

In Fig. 5 is shown a modified form of control mechanism wherein the inner edge of the cam element is formed with a plurality of internal gear teeth 37, which mesh with the teeth of a gear sector 38 pivotally mounted to the backing plate 16 and having connection with the brake rod 36 for the purpose heretofore described.

If desirable, the brake shoes may be constructed to be self energizing, as shown in Fig. 3, wherein the elongated openings 21 and 22 respectively are disposed on an angle with the center of the brake shoes so that when brake pressure is applied the brake shoes will automatically move forward into braking position in the direction indicated by the arrow.

I claim

A vehicle brake comprising a brake drum secured to the wheel of a vehicle, a backing plate therefor, a plurality of spring released, radially disposed brake shoes mounted for movement radially of said backing plate, grooved rollers extending from the inner edge of said brake shoes, a rotatable ring cam shaped element floatingly supported with respect to said backing plate and disposed within the grooves in said rollers and operating when rotated in one direction to move said brake shoes automatically and apply braking pressure to said brake drum, said element being bodily shiftable relative to said brake drum to thereby adjust said brake shoes to a position concentric to the axis of rotation of said drum and obtain equalized brake pressure on all shoes, control means for actuating said ring cam element and a pair of stop elements carried by said backing plate normally extending through slots provided in the ends of each shoe and acting as supports therefor, and stops for restraining movement of said shoes to each other, the slots in said shoes being respectively parallel and inclined in the direction of rotation of said brake drum to thereby obtain a self energizing action of said brake shoes.

EDGAR R. WEAVER.